United States Patent [19]

Charbonnier et al.

[11] Patent Number: 5,684,608
[45] Date of Patent: Nov. 4, 1997

[54] CORDLESS COMMUNICATION FACSIMILE SYSTEM

[75] Inventors: Philippe Charbonnier, Maisons-Laffitte; Jean Rene Carriou, Cergy, both of France

[73] Assignee: Societe d'Applications Generales d'Electricite et de Mecanique Sagem

[21] Appl. No.: 421,084

[22] Filed: Apr. 13, 1995

[30] Foreign Application Priority Data

Apr. 14, 1994 [FR] France .................. 94 04444

[51] Int. Cl.⁶ .................................. H04N 1/32
[52] U.S. Cl. .................... 358/442; 379/58; 379/61
[58] Field of Search ........................ 358/400, 442, 358/468; 379/58–61, 100; H04N 1/32

[56] References Cited

U.S. PATENT DOCUMENTS

| | | | |
|---|---|---|---|
| 4,748,655 | 5/1988 | Thrower et al. | 379/60 |
| 5,200,991 | 4/1993 | Motoyanagi | 358/442 |
| 5,347,562 | 9/1994 | Candy | 379/58 |
| 5,353,329 | 10/1994 | Hayashi | 379/58 |
| 5,416,828 | 5/1995 | Hiramatsu et al. | 379/100 |
| 5,426,511 | 6/1995 | Nagatomo | 379/58 |
| 5,450,471 | 9/1995 | Hanawa et al. | 379/61 |
| 5,479,485 | 12/1995 | Hayashi | 379/61 |
| 5,517,552 | 5/1996 | Yamashita | 379/58 |
| 5,519,763 | 5/1996 | Namekawa et al. | 379/58 |
| 5,524,046 | 6/1996 | Paniccia, Jr. | 379/61 |
| 5,590,406 | 12/1996 | Bayley et al. | 379/59 |

FOREIGN PATENT DOCUMENTS

| | | |
|---|---|---|
| 455157 | 6/1991 | European Pat. Off. . |
| 450497 | 9/1991 | European Pat. Off. . |
| 455987 | 11/1991 | European Pat. Off. . |

OTHER PUBLICATIONS

Motorola Technical Developments, 20(1983) Oct., Shaumberg, IL, US.

*Primary Examiner*—Kim Vu
*Attorney, Agent, or Firm*—Graham & James LLP

[57] ABSTRACT

The system comprises a processor, a routing unit (3), linked to the processor, in order to be linked to a line (10) of a telephone network (11) and to an associated telephone handset (12), a modem (4) linked to the processor and to the routing unit (3), an analysis and printing assembly and a control console, which are linked to the processor. It also includes a reversible radio module (2), linked to the routing unit (3) and to the processor in order to communicate by cordless link either, in handset mode, with a cordless telephone base linked to the telephone line, the associated handset being linked to the routing unit (3), or, in base mode, with the associated handset (12), the routing unit (3) then being linked to the telephone line (10).

7 Claims, 1 Drawing Sheet

CORDLESS COMMUNICATION FACSIMILE SYSTEM

The field of the invention is that of "cordless telephone" systems and of facsimile machines.

A "cordless telephone" system, or cordless telephone, includes a cordless telephone base, linked to a line of a telephone network, such as the switched telephone network STN, and a telephone handset capable of communicating with the base via a cordless link, generally a radio link.

A fax machine is an apparatus linked to a telephone line and including, on the one hand, a telephone handset and, on the other hand, an analysis and printing assembly capable of being linked to the line. A juxtaposition of a cordless telephone and of a facsimile machine has already been proposed, with a base and an analysis and printing assembly, capable of being linked to the line, and a telephone handset capable of communicating with the base via a cordless link.

The present invention proposes a system combining both the fax machine, the telephone and the cordless communication.

The present invention relates to a facsimile system, comprising a processor, a routing unit, linked to the processor and configured to be linked to a line of a telephone network and to an associated telephone handset, a modem linked to the processor and to the routing unit, an analysis and printing assembly and a control console, which are linked to the processor, characterized in that it includes a reversible radio module, linked to the routing unit and to the processor and configured to communicate by cordless link either, in handset mode, with a cordless telephone base linked to the telephone line, the associated handset being linked to the routing unit, or, in base mode, with the associated handset, the routing unit then being linked to the telephone line.

The facsimile system of the invention is doubly remarkable. It concerns a facsimile machine which is cordless and, furthermore, has a reversible nature, or mode, or is dual mode. It is capable, in connection with a base, of being used as a cordless telephone handset; it may also perform the base function for the associated handset, another telephone handset or another facsimile system of the invention configured as a cordless handset.

The invention exhibits numerous advantages, particularly associating those of a cordless telephone and of a facsimile machine combined with a cordless telephone. The installation of the system is particularly simple and, in handset mode, has very great flexibility.

In handset mode, the routing unit can link the radio module to the modem or to the associated telephone handset.

In base mode, the routing unit can link the telephone line either to the radio module, in order, with the processor, to perform the telephone function of a cordless base for the associated handset, or to the modem, to perform the facsimile function.

The radio module may include two frequency generators and the processor may be configured, under the control of the console, to make any one of the two generators operate in transmission and the other in reception, the system thus being capable overall of implementing a signalling protocol of the CT0 standard.

The radio module may also include only one single frequency generator and the processor be configured, under the control of the console, to make the generator operate, in transmission, on a time-division channel, and, in reception, on another channel, the system thus being capable overall of implementing a signalling protocol of the CT2 standard.

The processor may be arranged, in handset mode, to allow the poling of a plurality of cordless telephone bases and, in base mode, the poling of a plurality of cordless handsets.

The invention will be better understood with the aid of the following description of the preferred embodiment of the system of the invention, with reference to the attached drawing, in which.

Figure 1:
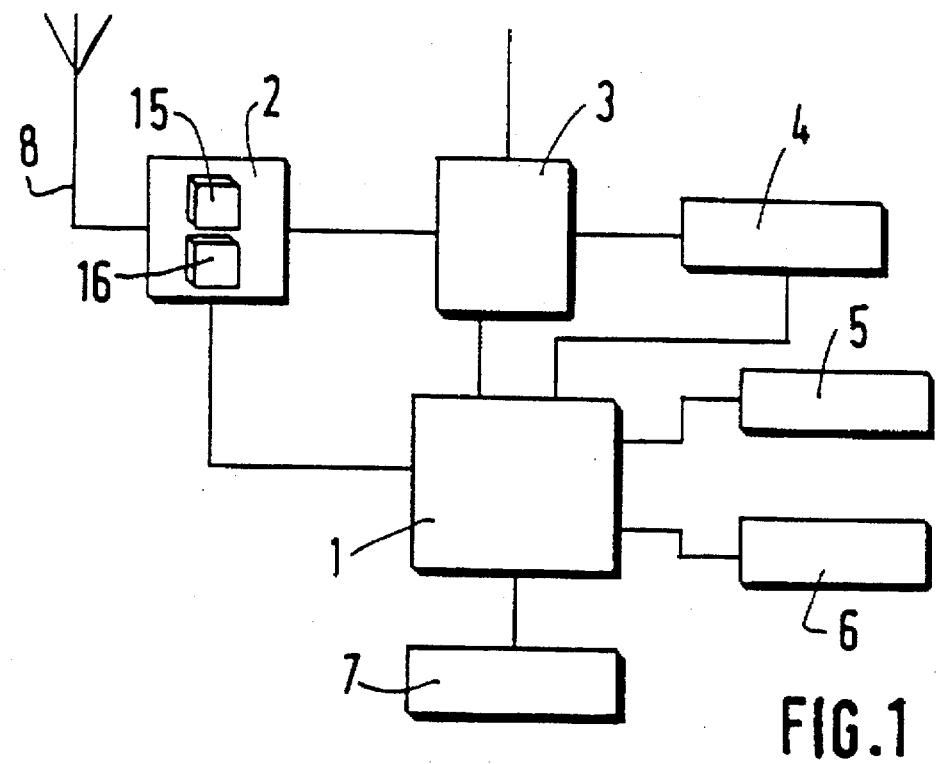
FIG. 1 is a diagrammatic structural representation of the system.

The facsimile system comprises a processor 1 and, linked to it, a radio transmitter-receiver module 2, a routing unit 3, a modem 4, an analysis module 5, a printing module 6 and a control console 7. The radio module 2 is also linked to an antenna 8 and to the routing unit 3. The routing unit 3 is also linked to the modem 4.

The radio module 2 is reversible. When the system is used as a cordless telephone handset, that is to say when it is used in handset mode, the radio module 2 can communicate with a cordless telephone base. When the system is used as a cordless telephone base, that is to say when it is used in base mode, the radio module 2 can communicate with an associated telephone handset, another cordless telephone handset or even another similar facsimile system.

Figure 3:
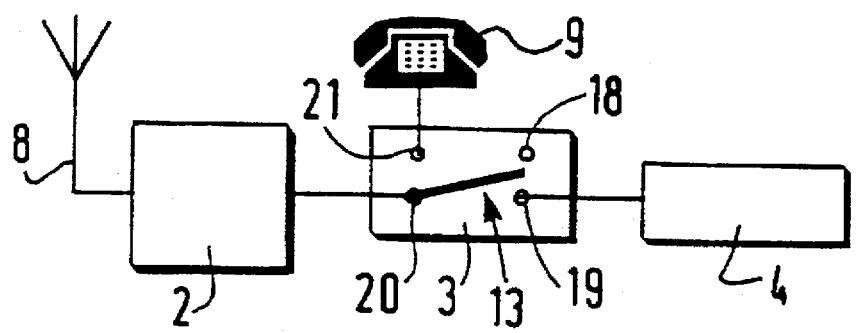
FIG. 3 is a representation of the radio head of the system, in handset mode.

In handset mode (FIG. 3), the system is a cordless facsimile machine, with an associated telephone instrument 9 linked to the routing unit 3, capable of being linked to a line of a telephone network via the radio module 2, the antenna 8 and a cordless telephone base linked to the line.

Via the processor 1 and the routing unit 3, it is possible to link the radio module 2 either to the modem 4 to the associated instrument 9 or by a switch 13.

Figure 2:
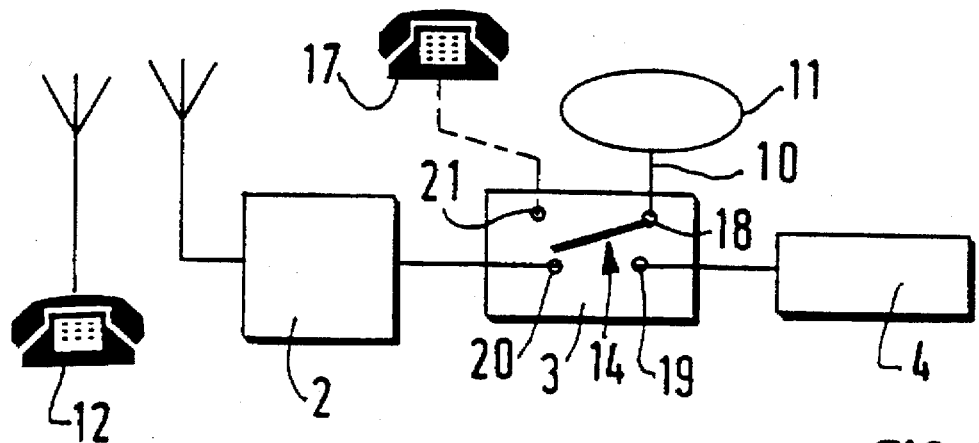
FIG. 2 is a representation of the radio head of the system, in base mode.

In base mode (FIG. 2), the routing unit is linked to a line 10, of a telephone network 11, which the routing unit 3, via a switch 14 and the processor 1, can switch either onto the radio module 2, or onto the modem 4, or possibly onto an associated cord-connected instrument 17. When the line 10 is linked to the radio module 2, the system operates as a cordless telephone base for the associated cordless telephone instrument 12; when the line 10 is linked to the modem 4, the system operates as a conventional facsimile machine.

Diagrammatically, the routing unit 3, which is also a line interface, includes the switches 13 and 14, controlled by the processor 1, in order respectively to link the terminal 20 to one of the terminals 19 and 21, and the terminal 18 to one of the terminals 19, 20 and 21.

The radio transmitter-receiver module 2 includes two frequency generators (15, 16) for implementing the signalling protocol of the CT0 standard, via the processor 1.

For implementing the signalling protocol of the CT2 standard, only one of the two generators is used, transmission and reception being carried out, by virtue of the processor 1, on two different time-division channels. At the functional level, the radio module therefore consists of the transmitter-receiver 2 and of the processor 1.

When the mode of use of the system is changed, from the telephone handset mode into base mode or conversely, in standardized CT0 signalling, the outputs of the two frequency generators 15, 16 are switched over and, in CT2 standardized signalling, the settings of the channels of the transmitter in use are switched over.

We claim:

1. Facsimile system, comprising a processor (1), a routing unit (3), linked to the processor and configured to be cordlessly linked to a line (10) of a telephone network (11) and linked to an associated telephone handset (9) in handset mode, and linked to a line (10) and cordlessly linked to an associated cordless handset (12) in base mode, said system further comprising a modem (4) linked to the processor (1) and to the routing unit (3), an analysis and printing assembly (5,6) and a control console (7), which are linked to the processor (1), characterized in that the system includes a reversible radio module (2) linked to the routing unit (3) and to the processor (1) and configured to communicate by cordless link, in handset mode, with a cordless telephone base linked to the telephone line (10), the associated telephone handset (9) being linked to the routing unit (3), or, in base mode, with the associated cordless handset (12), the routing unit (3) then being linked to the telephone line (10).

2. System according to claim 1, in which, in handset mode, the routing unit (3) can link the radio module (2) to the modem (4) or to the associated telephone handset (9).

3. System according to one of claim 1, in which, in base mode, the routing unit (3) can link the telephone line (10) either to the radio module (2), in order, with the processor (1), to perform the telephone function of a cordless base for the associated handset (12), or to the modem (4), to perform the facsimile function.

4. System according to claim 1, in which the radio module (2) includes two frequency generators (15, 16) and the processor (1) is configured, under the control of the console (7), to make one of the two generators operate in transmission and the other in reception, for implementing a signalling protocol of the CT0 standard.

5. System according to claim 4, in which the processor (1) is configured, under the control of the console (7), to make one of the two generators operate, in transmission, on one channel, and, in reception, on another channel, for implementing a signalling protocol of the CT2 standard.

6. System according to claims 1, in which the radio module includes a single frequency generator and the processor (1) is configured, under the control of the console (7), to make the generator operate in transmission, on a time-multiplexed channel, and in reception, on another channel, for implementing a signalling protocol of the CT2 standard.

7. System according to claim 1, in which the processor (1) is arranged, in handset mode, to allow the poling of a plurality of cordless telephone bases and, in base mode, the poling of a plurality of cordless handsets.

* * * * *